(12) United States Patent
Peer et al.

(10) Patent No.: US 9,098,563 B2
(45) Date of Patent: Aug. 4, 2015

(54) COMPARING VERSIONS OF A HIERARCHICAL OBJECT

(75) Inventors: Eitan Peer, Jerusalem (IL); Ido Hadanny, Tel Aviv (IL); Liron Shebs, Rosh Ha-Ayin (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1391 days.

(21) Appl. No.: 12/502,641

(22) Filed: Jul. 14, 2009

(65) Prior Publication Data

US 2011/0016099 A1 Jan. 20, 2011

(51) Int. Cl.
G06F 7/00 (2006.01)
G06F 17/00 (2006.01)
G06F 17/30 (2006.01)

(52) U.S. Cl.
CPC ............................... *G06F 17/30589* (2013.01)

(58) Field of Classification Search
CPC ......................................................... G06F 8/71
USPC ................................................. 707/638, 695
See application file for complete search history.

(56) References Cited

U.S. PATENT DOCUMENTS

| | | | |
|---|---|---|---|
| 2003/0145310 A1* | 7/2003 | Thames et al. | 717/123 |
| 2004/0015468 A1* | 1/2004 | Beier et al. | 707/1 |
| 2004/0031027 A1* | 2/2004 | Hiltgen | 717/170 |
| 2004/0103393 A1* | 5/2004 | Reddy et al. | 717/122 |
| 2006/0225030 A1* | 10/2006 | Deffler | 717/104 |
| 2008/0168183 A1* | 7/2008 | Marcy et al. | 709/248 |

OTHER PUBLICATIONS

Asahi et al., Using Treemaps to Visualize the Analytic Hierarchy Process, Apr. 1995 (19 pages).
Chawathe, Comparing Hierarchical Data in External Memory, Proceedings of the 25th VLDB Conference, Edinburgh, Scotland, 1999 (12 pages).
Kolatch et al., CatTrees: Dynamic Visualization of Categorical Data Using Treemaps, CMSC838b, May 2001 (10 pages).

* cited by examiner

*Primary Examiner* — Khanh Pham
*Assistant Examiner* — Van Oberly
(74) *Attorney, Agent, or Firm* — Trop, Pruner & Hu P.C.

(57) ABSTRACT

A hierarchical object is exported from a first electronic system to a second electronic system, where the hierarchical object is modifiable at each of the first and second electronic systems, and where a baseline version of the hierarchical object is created. A first version of the hierarchical object at the first electronic system is compared against the baseline version, to form a first data structure identifying any changes between the first version of the hierarchical object and the baseline version. A second data structure is received identifying changes between a second version of the hierarchical object at the second electronic system and the baseline version. A visualization based on the first and second data structures is provided.

18 Claims, 4 Drawing Sheets

COMPARING VERSIONS OF A HIERARCHICAL OBJECT

BACKGROUND

An enterprise, such as a company, educational organization, and government agency, can maintain a relatively large number of data items. Examples of data items include intellectual assets created by personnel of the enterprise. For example, business, product, software or other types of specifications or other design documents can be created for various projects. As another example, test documents can be created that define tests to be applied to projects in the enterprise. Such intellectual assets can be linked together to form a hierarchical object. For example, a first specification may contain other specifications or test documents.

During use, such a hierarchical object may change over time. In some cases, a hierarchical object may be exported from one system to another, which can make identifying changes difficult.

BRIEF DESCRIPTION OF THE DRAWINGS

Some embodiments of the invention are described with respect to the following figures.

DETAILED DESCRIPTION

Figure 1:
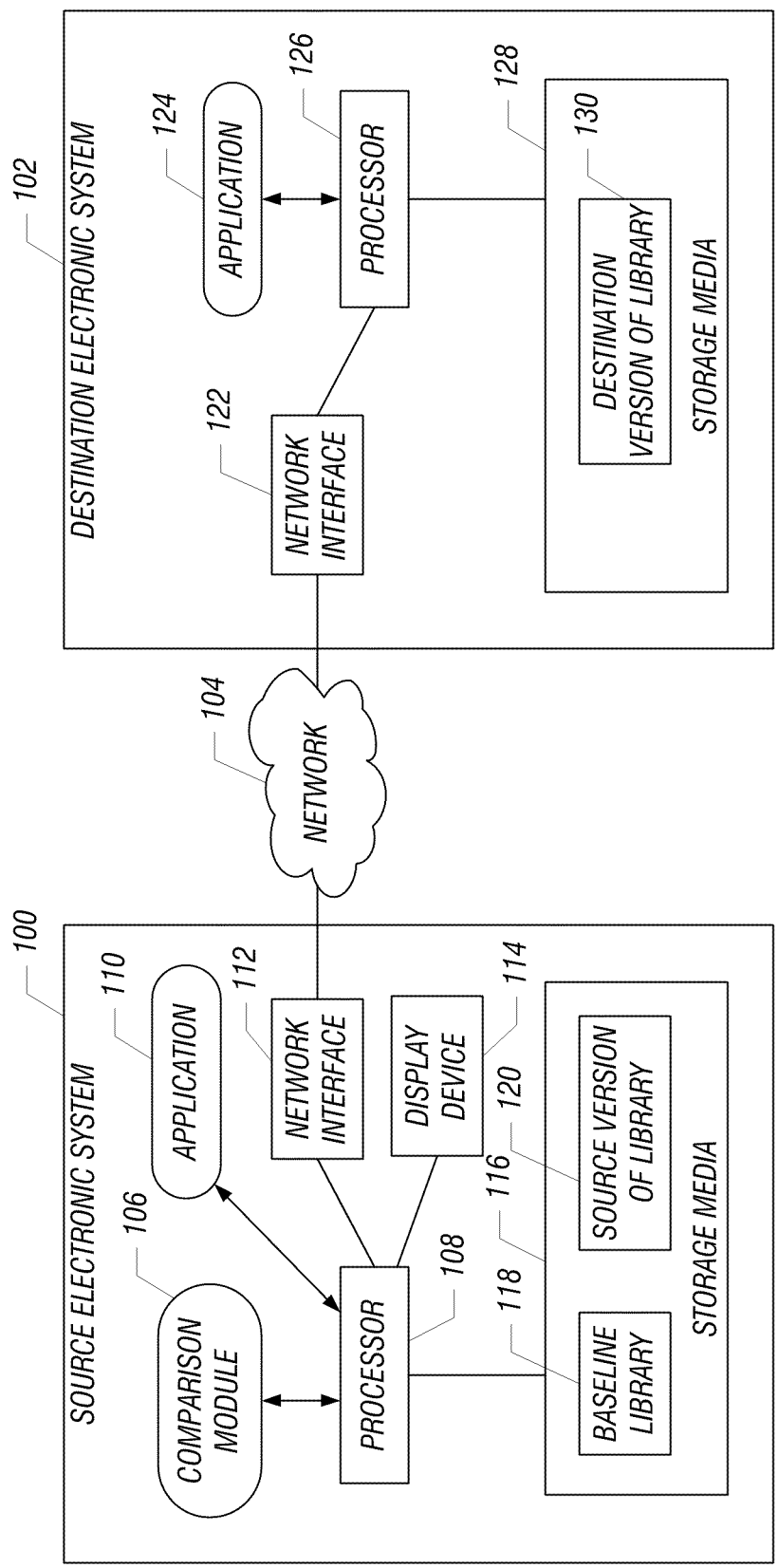
FIG. 1 is a block diagram of an exemplary arrangement that includes a source electronic system and destination electronic system that perform tasks according to an embodiment.

Hierarchical objects can be maintained by an enterprise and shared by personnel in the enterprise. A hierarchical object can include a hierarchical arrangement of data items (also referred to as "entities"). In some implementations, the data items can be intellectual assets created by personnel of the enterprise. For example, the intellectual assets can include specifications, test documents, reports, and so forth. Some intellectual assets can contain or refer to other intellectual assets, which in turn can further contain or refer to yet other intellectual assets. Such containment or reference relationships among intellectual assets establish a hierarchical arrangement of the intellectual assets.

In the ensuing discussion, a hierarchical arrangement of intellectual assets (a hierarchical object) is referred to as a library. Multiple libraries can be maintained in one or more repositories. A "library" can be thought of as a logical container of data items (entities) that are arranged hierarchically. An entity can have links to other entities, where each link is used to indicate that one entity contains or refers to another entity. A library thus represents a collection of entities and their links.

A library can be shared within an enterprise (such as between different projects or departments), or shared between an enterprise and another system outside the enterprise. To allow sharing, such a library is exported from a source to a destination. If the library is maintained at a source electronic system (which can include processing and storage resources), then the library can be exported to a destination electronic system (which can also include processing and storage resources). Exporting the library causes a copy of the library to be provided from the source electronic system to the destination electronic system.

Users at the source electronic system can continue to use (and possibly make modifications to) the library. Concurrently, users at the destination electronic system can also use (and possibly make modifications to) the library. As a result, it is possible that different modifications are made to the two versions of the library at the source and destination electronic systems, respectively.

In accordance with some embodiments, a comparison mechanism is provided to enable comparison of multiple versions of a hierarchical object (library), where the versions include a first version at a source electronic system, and a second version exported to a destination electronic system. The versions of the hierarchical object are compared to a baseline version of the hierarchical object. The baseline version of the hierarchical object refers to the hierarchical object at the time of exporting of the hierarchical object, or alternatively, the baseline version can refer to a version of the hierarchical object resulting from synchronization among different versions of the hierarchical object (where changes among the hierarchical objects have been combined to produce a consistent version). More generally, a baseline version of a library (or more simply a baseline library) refers to a hierarchical object that represents a collection of entities and their links at a particular point in time—the baseline library can be captured for historical and audit purposes, for example.

As a result of the comparing, the comparison mechanism produces data structures that represent changes (if any) to the hierarchical object (with respect to the baseline) that have occurred at the source electronic system, and changes (if any) to the hierarchical object (with respect to the baseline) that have occurred at the destination electronic system.

The data structures that represent changes of the versions of the hierarchical object at the source and electronic system can be visualized (such as by display at a display device), so that a user can see the changes that have been made at the source and destination electronic systems. This allows the user to easily compare the differences between the versions of the hierarchical object at the source and destination electronic systems.

A user may wish to view changes (if any) that have been made to the different versions of the hierarchical object before the user causes further processing to be applied to the different versions of the hierarchical object, such as synchronizing the different versions.

FIG. 1 illustrates an exemplary arrangement that includes a source electronic system 100 and a destination electronic system 102, according to an embodiment. The source electronic system 100 is connected to the destination electronic system 102 by a network 104, such as a local area network (LAN), wide area network (WAN), Internet, and so forth. Examples of the source and destination electronic systems 100 and 102 include one or more of: desktop computer, notebook computer, server computer, personal digital assistant (PDA), smartphone, network communications device, appliance, and so forth.

The source electronic system 100 includes a library 118 (referred to as a "baseline library" in this example since the library 118 is exported to the destination electronic system 102). The library 118 is stored in a storage media 116 of the source electronic system 100. The storage media 116 can be implemented with one or more disk-based storage devices and/or one or more integrated circuit or semiconductor memory devices.

A source version of the library (120) is also stored in the storage media 116. The source version 120 is the current version of the library (which may have been changed relative to the baseline library 118). The exported library is stored as a destination version of the library (130) in a storage media 128 of the destination electronic system 102. The destination version of the library (130) may also have been changed relative to the baseline library 118.

The source electronic system 100 includes a comparison module 106 that is able to perform comparisons of hierarchical objects, in accordance with some embodiments. The hierarchical objects that can be compared by the comparison module 106 include the baseline library 118, source version 120 of the library, and destination version 130 of the library.

The comparison module 106 is executable on a processor 108 in the source electronic system 100. In addition, the source electronic system 100 also includes a software application 110 that is executable on the processor 108.

The processor 108 is connected (directly or indirectly) to the storage media 116, a network interface 112, and a display device 114. The network interface 112 allows the source electronic system 100 to communicate over the network 104, and the display device 114 allows results of comparisons of hierarchical objects to be displayed.

The destination electronic system 102 also includes a network interface 122 to allow the destination electronic system 102 to communicate over the network 104. The network interface 122 is connected to a processor 126, which is connected to the storage media 128. A software application 124 is executable on the processor 126.

In the example shown in FIG. 1, it is assumed that for purposes of comparison, the destination version 130 of the library is transmitted back to the source electronic system 100 for comparison by the comparison module 106 to the baseline library 118. Alternatively, the destination electronic system 102 can also be provided with a comparison module similar to comparison module 106, which would be able to compare the destination version 130 with the baseline library 118 (assuming a duplicate of the baseline library 118 is provided to the destination electronic system 102). The results of the comparison at the destination electronic system 102 can then be provided back to the source electronic system 100 for display by the display device 114 at the source electronic system 100.

The result of the comparisons performed by the comparison module 106 among the baseline library 118, source version 120 of the library, and destination version 130 of the library, are two result trees that can be displayed side by side. Each of the displayed trees provides a representation of the hierarchical entities within each library. Although trees are displayed in some embodiments, it is noted that in other embodiments, the comparisons can be represented using other types of data structures that allow the hierarchical entities of the library to be represented.

Figure 2:
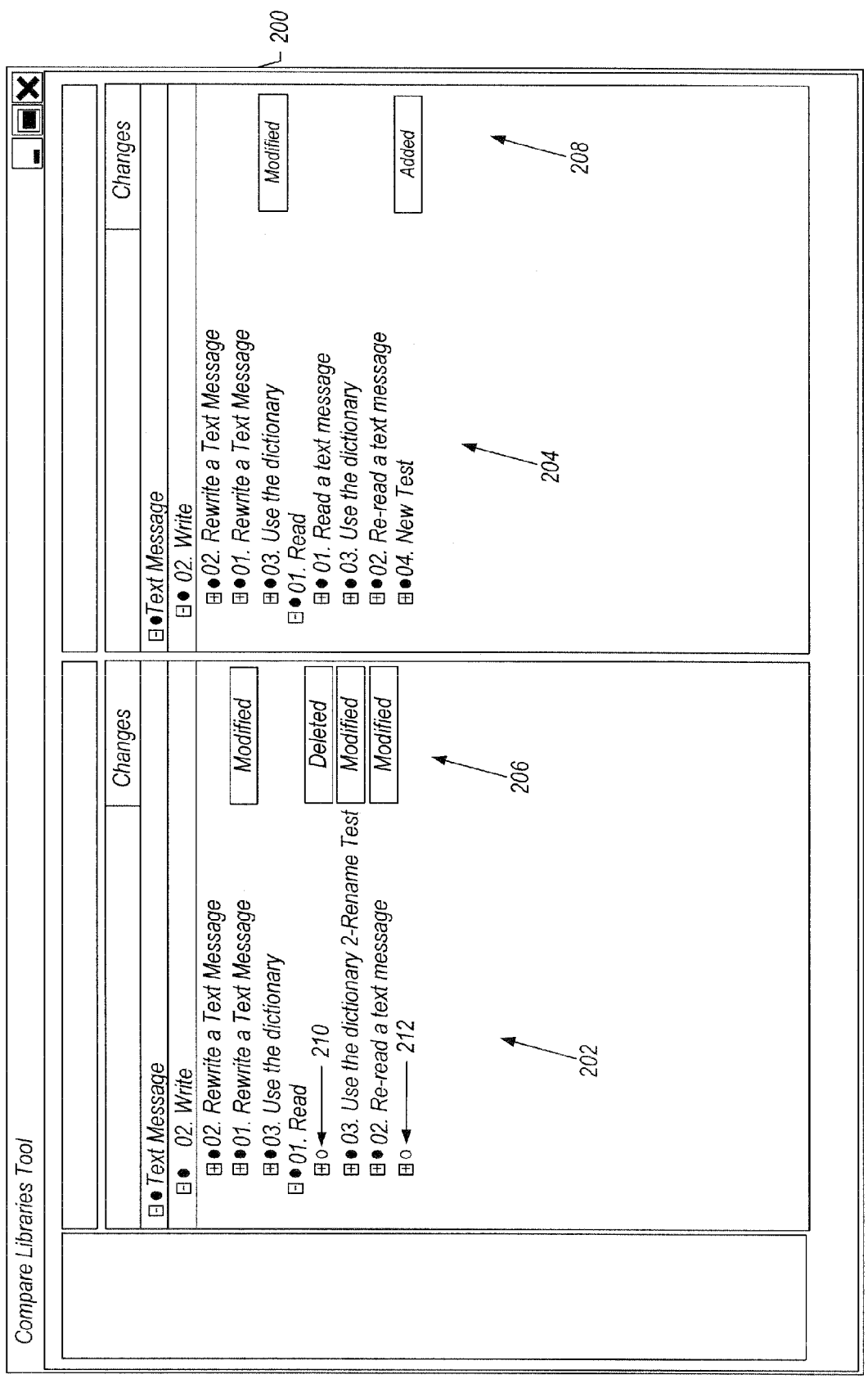
FIG. 2 illustrates a screen displaying result trees produced by comparing hierarchical objects, according to an embodiment.

FIG. 2 illustrates an exemplary graphical user interface (GUI) screen 200 that has a split-screen to depict a first result tree 202 and a second result tree 204. The first result tree 202 provides an indication of changes made in the source version 120 of the library with respect to the baseline library 118, while the second result tree 204 provides an indication of changes made in the destination version 130 of the library with respect to the baseline library 118.

Each of the first and second result trees 202 and 204 includes a hierarchical arrangement of entities that make up the respective source version 120 and destination version 130 of the library. The first result tree 202 depicts nodes corresponding to all entities of the baseline library 118 as well as any added nodes in the source version 120 of the library. Similarly, the second result tree 204 depicts nodes corresponding to all entities of the baseline library 118 as well as any added nodes in the destination version 130 of the library. The first and second result trees 202 and 204 share the same overall structure, such that comparison nodes of the first result tree 202 are aligned with corresponding comparison nodes of the second result tree 204.

Each of the result trees 202, 204 has a root node "Text Message," with second level "Write" and "Read" nodes underneath the root node "Text Message." Each of the "Write" and "Read" nodes further include sub-nodes. In this example, the library that is depicted is a test library that depicts tests to be performed with respect to a text message.

Each node in the result tree 202 or 204 is a comparison node that is associated with a status change indication 206 or 208.

For example, the "Create a text message" comparison node in the result tree 202 has a "Modified" indication to indicate that the "Create a text message" entity of the source version 120 of the library has been modified with respect to the baseline library 118. Another comparison node (marked with a circle 210) underneath the "Read" comparison node in the result tree 202 is associated with a "Deleted" indication to indicate that this particular entity has been deleted from the source version 120 of the library (which is present in the baseline library 118). The circle in a result tree is considered a "ghost" mark to indicate that the corresponding entity does not actually exist in the corresponding source version or destination version of the library (in other words, the corresponding entity has either been moved or deleted).

In the result tree 204, a comparison node "New Test" is associated with the "Added" status indication to indicate that the corresponding entity was added to the destination version 130 of the library (and this entity does not exist in the baseline library 118). In the result tree 202 for the source version 120, a ghost mark (circle 212) is added that corresponds to the comparison node "New Test." The ghost mark 212 indicates that the corresponding entity exists in the destination version 130 of the library but does not exist in the source version 120 of the library.

More generally, a ghost comparison node (identified by the ghost mark) is added for any entity that has had a structural change in a corresponding version of the library—for example, the entity was added, deleted, or moved in the version of the library in comparison to the baseline library Tb.

Generally, a comparison node is a hierarchical element (that is part of a hierarchical structure) that references an entity of a library. In one example, a comparison node can include the following attributes (some of the attributes can be omitted or replaced with other attributes in other implementations):

Node ID, which is a unique identifier of the comparison node;

Referenced entity type, to indicate the type of entity (e.g., specification, test, etc.) that the comparison node references;

Referenced entity ID, which is the identifier of the library entity that the comparison node references;

Library ID, which is the identifier of the library to which the entity belongs;

Ghost mark, which indicates that the comparison node does not reference an actual entity—in other words, the comparison node was added just to fill gaps in order to have the same structure for both result trees (such a comparison node is considered to be a "ghost" node);

Change status, to denote whether the entity was added, deleted or moved since a point in time associated with the baseline library (the change status also indicates whether the entity was modified since the point in time of the baseline library—the change status is assigned a "none" or null value if none of the above is true).

Parent node ID, which is a link to the comparison node's parent;

Counterpart node ID, which links to the corresponding node in the other result tree (each comparison node has a counterpart in the source and destination result trees to allow both trees to have the same structure); and Node path, which is the comparison node's location in the result tree hierarchy.

Figure 3:
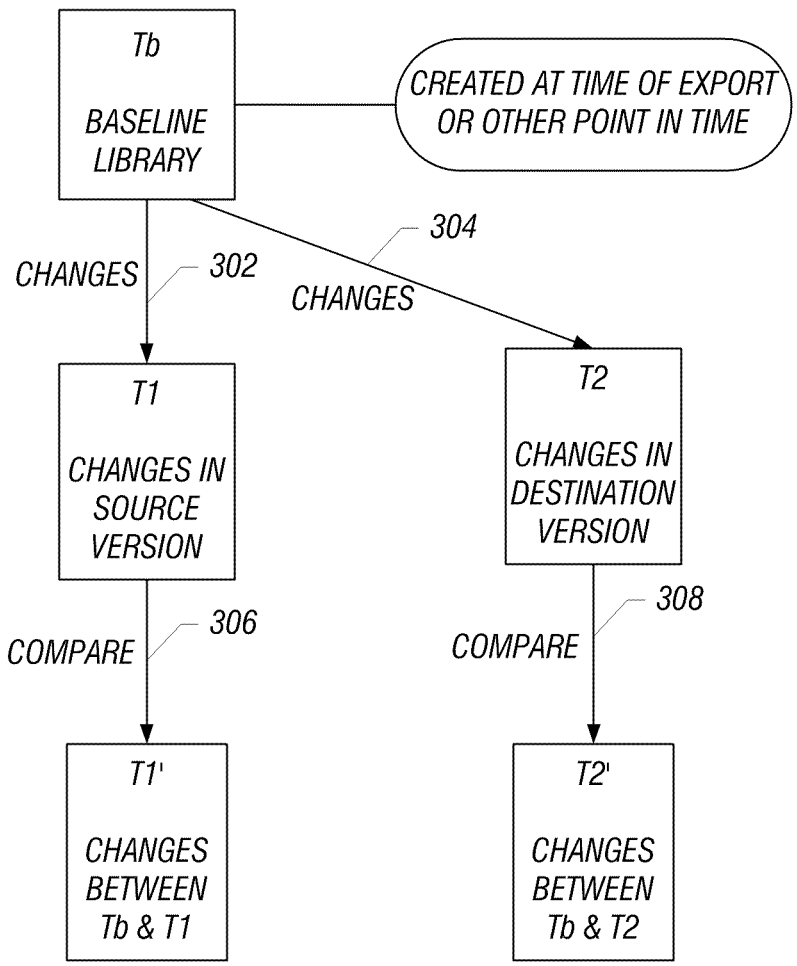
FIG. 3 illustrates a baseline library, a first library, a second library, and data structures containing changes between the baseline library and respective first and second libraries, in accordance with an embodiment.

FIG. 3 shows an example in which a baseline library Tb is created at the time of export from a source electronic system to a destination electronic system (or at another point in time). After creation of the baseline library Tb and export of the library, changes 302 and 304 can be made to the source version of the library and the destination version of the library, respectively. The current source version of the library is named T1 (which is located at the source electronic system), while the current destination version of the library is named T2 (which is located at the destination electronic system).

Comparisons (306, 308) are then applied to the source and destination versions T1 and T2 of the library to produce result trees T1' and T2', which contain comparison nodes identifying changes between the baseline library Tb and respective versions T1 and T2. Note that T1' and T2' have the same structure such that meaningful comparison can be made between T1' and T2' to easily identify the changes made from the baseline library Tb in the two different versions T1 and T2.

Figure 4:
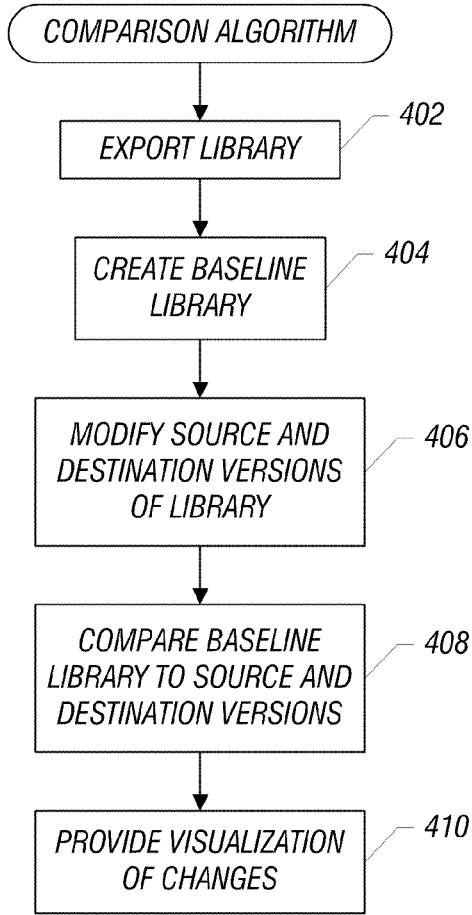
FIG. 4 is a flow diagram of a process of a comparison algorithm, according to an embodiment.

A general flow diagram of a comparison algorithm is shown in FIG. 4. A library is exported (at 402), such as from one project to another project within an enterprise. In response to the exportation, a baseline library is created (at 404). In an alternative embodiment, the baseline library can be created at another point in time (such as due to synchronization between different versions of a library or due to some other event). After creation of the baseline library, the source and destination versions of the library are modified (at 406) at respective source and destination electronic systems.

At some later point in time, the baseline library is compared (at 408) to each of the source and destination versions. The comparisons can be initiated in response to user request, for example. The comparisons of the baseline library to the source and destination versions cause creation of corresponding result trees. Visualizations of the changes between the baseline library and the source and destination versions of the library, as reflected in the result trees, are then provided (at 410), such as in the form of the GUI screen in FIG. 2.

Figure 5:
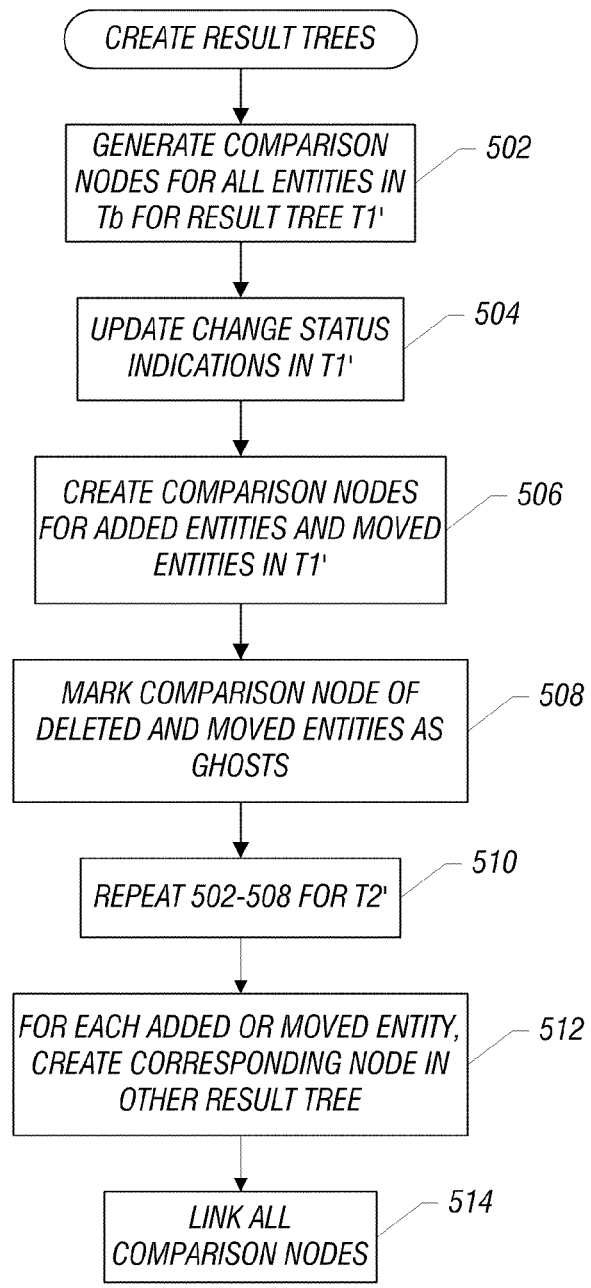
FIG. 5 is a flow diagram of a process of creating result trees, according to a further embodiment.

A process for creating result trees according to a further embodiment is shown in FIG. 5. For result tree T1' (depicted in FIG. 3), comparison nodes are generated (at 502) for all entities in the baseline library Tb. For each such comparison node in T1', the corresponding change status indication (e.g., modified or deleted) is updated (at 504). Note that if a particular entity of the baseline library Tb has not been modified in source version T1 of the library, then the status indication of the corresponding comparison node in the result tree T1' will not have an associated value (to indicate no change).

Detecting modification of an entity can be accomplished according to the following. A change in the entity version stamp can be detected. A version stamp is a counter that is incremented whenever the entity is changed. Alternatively, modification of an entity can be detected by detecting a change in the version stamp of an owned entity. For example, if a test design step has changed, then the test is also considered as changed because its meaning changed, although the change was not in any of the test's fields. Another modification can be detected by detecting a new link that was added to the entity since the point in time of the library. For example, a specification in the library has a new traceability link to another specification. A further modification can be detected if an existing link in which the entity participated in was deleted since the point in time of the baseline library.

In the result tree T1', comparison nodes for entities added to the source version T1 of the library are created (at 506). Also, comparison nodes for entities that have been moved in T1 are also created—note that a move is associated with first deleting the entity at its original location and adding a new entity at the new location.

Each comparison node of a deleted entity or moved entity is marked (at 508) as a ghost (such as with a circle as shown in FIG. 2).

The tasks 502-508 are repeated (at 510) for the other result tree T2'.

Next, for each added or moved entity in T1 or T2 (for which a corresponding comparison node was created at 506 in T1' or T2'), a corresponding comparison node is added (at 512) in the other result tree T2' or T1' such that the structures T1' and T2' remain the same. In the example of FIG. 2, a new comparison node "New Test" added to the result tree 204 (T2') causes a counterpart comparison node 212 (marked as a ghost) to be created in the first result tree 202 (T1').

The creation of ghost nodes as a result of 508 and 512 results in the following. All added entities in T1 have a ghost counterpart in T2', and all added entities in T2 have a ghost counterpart in T1'. All deleted entities in T1 appear as ghosts in T1'. Each entity that is moved in T1 carries with it all its children. The movement of an entity has a source and a target. The source appears as a ghost in T1', and the target appears as a new node in T1', and as a ghost in T2'. Similar ghost nodes are created when moving entities in T2.

The comparison nodes in T1' and T2' are then linked (at 514), using a mapping object that maps nodes in T1' to T2'.

Further details regarding some of the tasks discussed above are provided below. The following describes a structural change stage to detect structural changes between a version of the library and the baseline library. When comparing each version of the library to the baseline library, a result tree is created to which comparison nodes are added, where the comparison nodes display the changes that occurred to the entities in the version of the library. If an entity exists only in the version of the library, but not in the baseline library, then the result is added as an "added" node. If an entity exists only in the baseline library but not in the version of the library, then the result is added as a "deleted" node. Comparison nodes of deleted entities are marked as "ghosts".

If an entity exists both in the version of the library and the baseline library, but in a different hierarchy, e.g., one of its ancestors has changed since the point in time of the baseline library, and then the result is added as two comparison nodes: one comparison node for the entity in its old location, and one comparison node for the new location. Comparison nodes of moved entities in their old locations are marked as "ghosts."

Entities that exist both in the library and the baseline library which were not detected earlier as "moved" entities are added to the result as "unchanged" entities. The change status of these entities may later change to "modified" by a modification detection stage.

By the end of the structural change detection stage, the result trees are supersets of the baseline library. The result trees also include added nodes and moved nodes in their new locations, which are the only types of nodes that do not have counterparts in the other tree. For such comparison nodes, ghosts are added to the other tree as counterparts.

In some cases, comparison nodes that are marked as "modified" may be false positives—in other words, the corresponding entities were marked as modified but did not have an actual change in their data. An example of such a case is a test field that was changed from value A to value B, then back to value A. This change will change the version stamp for the entity, and thus based on the version stamp the entity will be considered modified. The false positives are filtered out by removing such false-positives. To remove the false positives, an algorithm comparing entities is used. For each comparison node with change status "modified," the corresponding entity from the baseline library is fetched, according to entity ID. The fetched entity from the baseline library is then compared with the corresponding entity that was marked "modified"—if the entities are not different, then the "modified" indication is removed.

By employing the comparison mechanism according to some embodiments, hierarchical objects sharing an import-export relationship can be compared to allow users to easily identify changes made to source and destination versions of a library (when compared to a baseline library). Visualization of the result trees can be provided, such as in a split-screen format, to allow a quick understanding of the changes.

Instructions of software described above (including the comparison module 106 of FIG. 1) are loaded for execution on a processor (such as processor 108 or 126 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs across one or multiple computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMS), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
exporting a hierarchical object from a first electronic system to a second electronic system, wherein the hierarchical object is modifiable at each of the first and second electronic systems, and wherein a baseline version of the hierarchical object is created;
comparing, by the first electronic system, a first version of the hierarchical object at the first electronic system against the baseline version, to form a first data structure identifying changes between the first version of the hierarchical object and the baseline version;
receiving, by the first electronic system, a second data structure identifying changes between a second version of the hierarchical object at the second electronic system and the baseline version, wherein each of the first and second data structures includes comparison nodes that represent respective entities of the first and second versions and depict how each of the first and second versions of the hierarchical object has changed from the baseline version; and
providing a visualization based on the first and second data structures, the visualization displaying the comparison nodes of the first and second data structures in respective first and second screens, wherein each of the comparison nodes of the first data structure has a corresponding comparison node in the second data structure, and wherein the comparison nodes of the first data structure are aligned with corresponding comparison nodes of the second data structure.

2. The method of claim 1, wherein displaying the comparison nodes comprises displaying status indicators associated with the comparison nodes, wherein each status indicator provides a status change indication of a corresponding entity of the hierarchical object.

3. The method of claim 2, wherein the status change indication is for indicating whether the corresponding entity of the hierarchical object has been added, deleted, or modified.

4. The method of claim 1, further comprising associating links between comparison nodes of the first data structure and comparison nodes of the second data structure.

5. The method of claim 1, wherein receiving the second data structure comprises receiving the second data structure based on comparing the second version with the first version at the first electronic system.

6. The method of claim 1, further comprising associating a ghost indicator with at least one of the comparison nodes of the first data structure or second data structure to indicate that a respective entity does not actually exist.

7. The method of claim 6, wherein associating the ghost indicator with the at least one of the comparison nodes of the first data structure or second data structure is performed in response to deletion of a corresponding entity from the corresponding first or second version of the hierarchical object.

8. The method of claim 6, wherein associating the ghost indicator with the at least one of the comparison nodes of the first data structure or second data structure is performed in response to moving a corresponding entity within the corresponding first or second version of the hierarchical object.

9. A method comprising:
exporting a hierarchical object from a first electronic system to a second electronic system, wherein the hierarchical object is modifiable at each of the first and second electronic systems, and wherein a baseline version of the hierarchical object is created;

comparing, by the first electronic system, a first version of the hierarchical object at the first electronic system against the baseline version, to form a first data structure identifying any changes between the first version of the hierarchical object and the baseline version;

receiving, by the first electronic system, a second data structure identifying changes between a second version of the hierarchical object at the second electronic system and the baseline version;

providing a visualization based on the first and second data structures; and associating a ghost indicator in the visualization with a particular comparison node of the first data structure to indicate that a respective entity of the hierarchical object does not actually exist in the first version but exists in the second version, and where the respective entity also does not exist in the baseline version.

10. The method of claim 9, wherein associating the ghost indicator with the particular comparison node of the first data structure is performed in response to addition of the respective entity in the second version of the hierarchical object.

11. A first electronic system comprising:

a storage media to store a first library and a baseline library, wherein the baseline library is created at a particular point in time, and wherein the first library is a modified version of the baseline library; and a processor to:

export the baseline library to a second electronic system to provide a second library at the second electronic system, wherein the second library is a modified version of the baseline library, and wherein each of the baseline library, first library, and second library has a hierarchical arrangement of entities;

compare the baseline library to each of the first and second libraries;

produce result trees based on the comparing, wherein each of the result trees includes a hierarchical arrangement of comparison nodes based on the hierarchical arrangements of the baseline library and a corresponding one of the first and second libraries; and align the comparison nodes of a first of the result trees with the comparison nodes of a second of the result trees, wherein each of the comparison nodes of the first result tree has a corresponding comparison node in the second result tree.

12. The first electronic system of claim 11, wherein each of the result trees has a corresponding comparison node for each of the entities present in the baseline library.

13. The first electronic system of claim 12, wherein each comparison node in each of the result trees that corresponds to an entity in the corresponding first or second library but not to an entity in the baseline library is marked as added.

14. The first electronic system of claim 12, wherein each comparison node in each of the result trees that corresponds to an entity in the baseline library but not to an entity in the corresponding first or second library is marked as deleted.

15. The first electronic system of claim 12, wherein each comparison node in the first result tree corresponding to the first library that corresponds to an entity added to the second library that is not added to the first library and that is not present in the baseline library is marked as a ghost node.

16. The first electronic system of claim 11, wherein the entities of the baseline, first, and second libraries represent intellectual assets.

17. An article comprising at least one non-transitory computer readable storage medium containing instructions that upon execution cause a first electronic system to:

export a hierarchical object to a second electronic system, wherein the hierarchical object is modifiable at each of the first and second electronic systems;

upon exporting, create a baseline version of the hierarchical object;

compare a first version of the hierarchical object at the first electronic system against the baseline version to form a first data structure identifying changes between the first version of the hierarchical object and the baseline version;

receive a second data structure identifying changes between a second version of the hierarchical object at the second electronic system and the baseline version, wherein each of the first and second data structures includes comparison nodes that represent respective entities of the first and second versions and depict how each of the first and second versions of the hierarchical object has changed from the baseline version; and provide a visualization of changes of the first and second versions with respect to the baseline version based on the first and second data structures, the visualization displaying the comparison nodes of the first and second data structures in respective first and second screens, wherein each of the comparison nodes of the first data structure has a corresponding comparison node in the second data structure, and the comparison nodes of the first data structure are aligned with corresponding comparison nodes of the second data structure.

18. The article of claim 17, wherein the instructions upon execution cause the first electronic system to further:

associate a ghost indicator with a particular comparison node of the first data structure to indicate that a respective entity of the hierarchical object does not actually exist in the first version but exists in the second version, and where the respective entity also does not exist in the baseline version.

\* \* \* \* \*